March 21, 1967     F. M. ROGALLO ET AL     3,310,261
CONTROL FOR FLEXIBLE PARAWING Original Filed Jan. 17, 1964     2 Sheets-Sheet 2

*INVENTORS*
FRANCIS M. ROGALLO
WILLIAM C. SLEEMAN, JR.

BY

*ATTORNEYS*

United States Patent Office 3,310,261
Patented Mar. 21, 1967

3,310,261
CONTROL FOR FLEXIBLE PARAWING
Francis M. Rogallo and William C. Sleeman, Jr., both of Newport News, Va., assignors to the United States of America as represented by the Administrator of the National Aeronautics and Space Administration
Continuation of application Ser. No. 338,535, Jan. 17, 1964. This application Feb. 9, 1966, Ser. No. 551,815
10 Claims. (Cl. 244—44)

The invention described herein may be manufactured and used by or for the Government of the United States of America for governmental purposes without the payment of any royalties thereon or therefor.

This application is a continuation of patent application Ser. No. 338,535, filed Jan. 17, 1964, entitled, Control for Flexible Parawing, now abandoned.

This invention relates to a control for a flexible wing vehicle, and more particularly to a boltrope control for a flexible wing aircraft.

Due to the increased use of the flexible wing as an aerodynamic lift surface for various types of air vehicles, such as gliders, powered drones, aircraft, and wings for the recovery of rocket boosters and space capsules, it has become necessary to provide an effective means for controlling the flexible wing. To date, the principle technique of control for a vehicle having a flexible wing lift surface is to shift the center of gravity of the payload with respect to the flexible wing surface. Although this type of control is satisfactory to a degree, it has been found to have many disadvantages. With this type of control the forces required to shift the payload with respect to the wing for trim over an appreciable speed range may be large and not have a stable variation with speed. Also, response of the vehicle may be slow due to the shifting of the large load. Furthermore, with the increasing size of vehicles utilizing the flexible wing, it has become impractical to shift the relative position of the wing of the vehicle center of gravity due to the weight and complexity of the mechanism necessary to accomplish the shift.

The use of the boltrope control, on the other hand, overcomes many of the above difficulties. It greatly reduces the control forces required. Control is accomplished by merely shortening and lengthening the boltrope in the trailing edge of the flexible wing membrane. Thus, as the boltrope is shorteded and lengthened the wing membrane is shortened and lengthened the same amount to provide control of the vehicle. By changing the wing configuration symmetrically pitch control is provided for whereas asymmetrical variation of the wing planform will provide roll control. Response of the vehicle is dependent only upon the rate at which the boltrope is shortened and lengthened, this speed being readily determinable by conventional servo mechanism.

It is, therefore, an object of the present invention to provide a control for a flexible wing vehicle by use of a boltrope.

Still another object of this invention is to provide a control for a flexible wing vehicle which will give rapid vehicle response.

Yet another object of this invention is to provide a control for a flexible wing vehicle which requires minimum control forces.

Another object of this invention is to provide a control for a flexible wing vehicle which is of a simple engineering design, economical to manufacture and maintain and is highly reliable.

Yet another object of this invention is to provide a flexible wing control system for utilizing a boltrope with a simple servo system.

A further object of the invention is to provide a control of the boltrope type for a flexible wing vehicle wherein the length of the boltrope may be varied by changing the position of a portion of the wing superstructure.

Yet another object of the invention is to provide a control of the boltrope type for a flexible wing vehicle wherein symmetrical variation of the boltropes provide pitch control and asymmetrical variation of the boltropes provide roll control.

These and other objects and advantages of the invention will become more apparent upon reading the specification in conjunction with the accompanying drawings.

Figure 4:
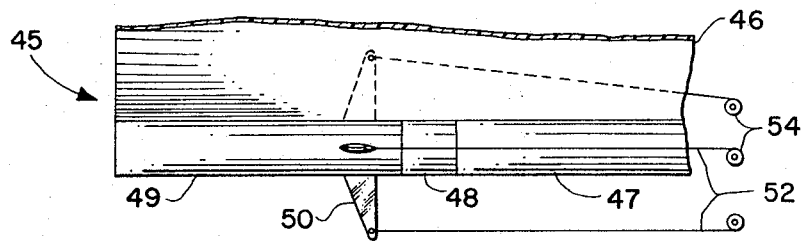
Figure 5:
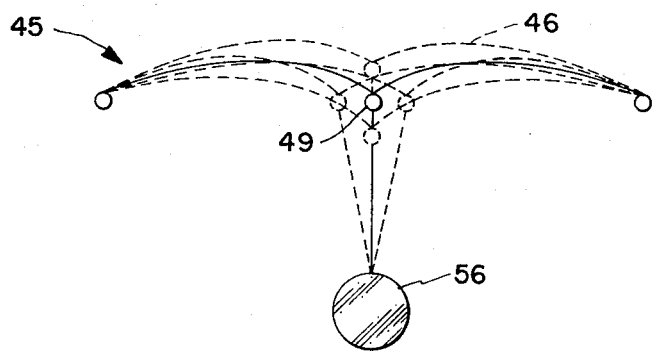

FIG. 4 is a side elevational view of a section of the flexible wing structure showing a section of the keel of the flexible wing universally connected to the remainder of the keel, and servo means for displacing the hinged section to vary the length of the boltropes and FIG. 5 is an end view of the vehicle utilizing the control mechanism of FIG. 4, showing the various configurations the wing membrane assumes to provide control of the vehicle.

Basically, this invention relates to a control of the boltrope type as applied to the flexible wing of a flexible wing vehicle. Generally speaking, the flexible wing would include a superstructure of a keel and leading edge members connected to an extremity thereof and projecting at an angle therefrom so as to generally form an overall triangular configuration. A flexible membrane is connected to the leading edge members and keel, and boltropes passed through enclosures formed in the trailing edge of the flexible membrane and fixed to mechanism for varying the length of the boltropes. Pitch control of the vehicle is accomplished by shortening and lengthening the boltropes symmetrically and by varying the length of the boltropes asymmetrically the roll of the vehicle can be controlled.

Referring now more specifically to the details of the invention, the flexible wing vehicle is designated generally by the reference numberal 10.

Figure 1:
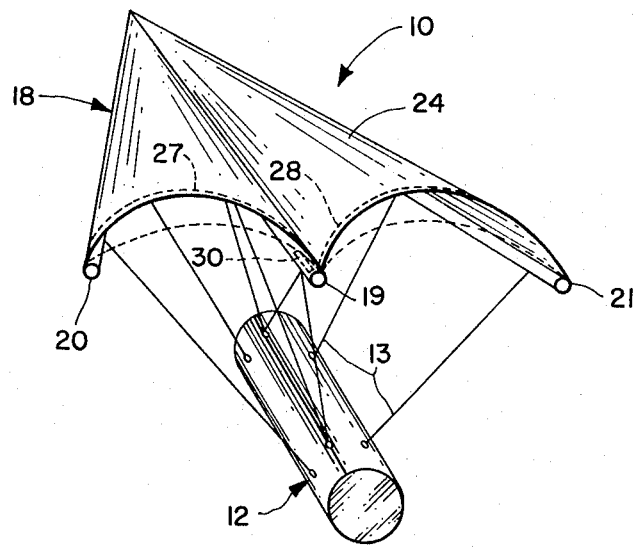
FIG. 1 is a perspective view of a vehicle wherein the payload is slung below the flexible wing structure having a boltrope control.

In the vehicle shown in FIG. 1 the wing 18 is connected to a payload 12 by shrould lines 13. The payload 12 is thus suspended below the wing; however, it should be understood that it is within the broadest aspect of the invention to construct the flexible wing vehicle such that the payload is an integral part of the wing superstructure. The payload 12 may be most any item which is capable of being airlifted, for example, a booster, a space capsule, a cargo carrier and many other items.

The wing 18 of the flexible wing vehicle has superstructure which includes a keel 19 and leading edge members 20 and 21. The leading edge members 20 and 21 are connected to the forward extremity of the keel 19 in a conventional manner and disposed at an angle thereto as clearly shown in FIG. 1. The keel and leading edge members may be constructed from various materials such as metal, plastic, and/or cloth. The members may also take various configurations such as a one-piece solid construction, a tubular member, a truss arrangement with a suitable covering or may be inflatable.

Figure 2:
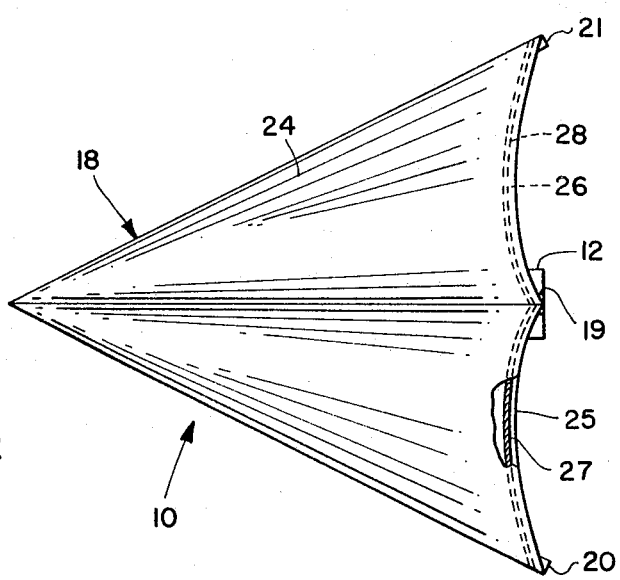
FIG. 2 is a plan view showing the flexible wing of the vehicle partially cut away to reveal the position of the boltrope relative to the flexible wing membrane.

The flexible wing membrane 24 is fixed to the leading edge members 20 and 21 and to a common line along the keel 19. The membrane may be constructed from various materials, may of the tough, lightweight, commercially available plastics being particularly suited for this purpose, as well as some of the high strength cloths now available. As viewed in FIG. 1, it is readily apparent that the wing is divided into panels or sections, the membrane connected between the keel 19 and the leading edge member 20 forming one panel and the membrane connected between the keel 19 and leading edge member 21 another panel. The left panel, as viewed in FIG. 1, or the lower panel as viewed in FIG. 2, is provided with a boltrope enclosure or channel 25. This channel is formed in the trailing edge of the wing membrane and may be constructed by merely turning over the edge of the material and fixing it upon itself in a well known manner. The enclosure may also be superimposed on the membrane and secured thereto by known techniques. The other panel has a similar enclosure 26. A left boltrope 27 is threaded through the enclosure 25 and housed therein. A right boltrope 28 is located within the enclosure 26. The boltrope may be constructed from materials such as nylon cord or wire. One end of the boltrope 27 is fixed to the leading edge member 20 and the one end of the boltrope 28 is fixed to the leading edge member 21. The other end of the boltropes are secured to the control mechanism now to be described.

Figure 3:
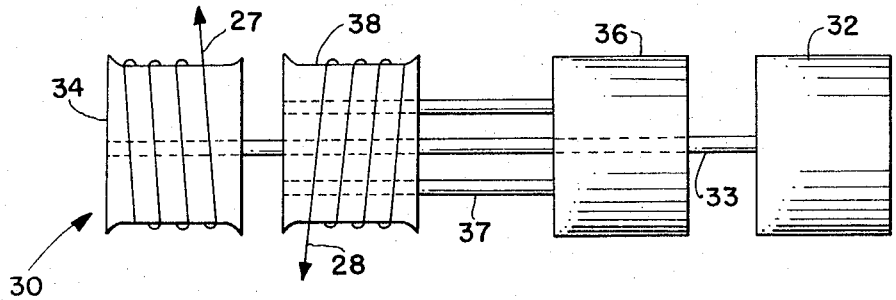
FIG. 3 is a side elevational view showing diagrammatically the mechanism utilized to vary the length of the boltrope.

One form of control mechanism is illustrated in FIG. 3 and designated generally by the reference numeral 30. The control mechanism 30 is shown housed within the keel 19; however, it is to be understood that the boltropes might be controlled from the leading edge members or the payload. The control mechanism 30 includes a left boltrope control motor 32 which has a shaft 33 and a winding drum 34 fixed to the shaft 33. The boltrope 26 is fixed to the drum 34 and wound thereabout. A right boltrope control motor 36 having a drive shaft 37 and a winding drum 38 are concentrically disposed about the shaft 33. The boltrope 28 is secured to and wound about the drum 38. The concentric arrangement of the right boltrope control motor 36 and its components is necessary only when the keel 19 is of very limited diameter, otherwise, it may be placed adjacent the left boltrope control motor and be of similar design. The motors 32 and 36 are reversible to provide for lengthening or shortening the boltropes. The motors may be controlled from the payload, from a cockpit if the vehicle is manned, or remotely by conventional electronic equipment (not shown). Obviously, drum windings could be done manually.

FIG. 4 shows a modified flexible wing control designated generally by the reference numeral 45. In this arrangement the keel 47 is jointed having a trailing edge section or keel control arm 49 connected together by a universal hinge or joint 48 (shown diagrammatically). The portion 49 of the keel is designed to have freedom of movement in at least the vertical direction as well as in the horizontal direction.

Horns 50 are fixed to the keel control arm at 90 degree intervals thereabout. Two of the horns are in a vertical plane passing through the keel and the other two in a horizontal plane passing through the keel. Actuator cables 52 are connected to the horns and to winding drums 54 located forward on the keel or in the payload. Manual control could be readily accomplished by fixing the cables to conventional linkage (not shown).

*Operation*

From the above description the operation of the control is now believed to be readily apparent. Considering first the control mechanism 30, wherein the boltrope control motors are actuated such that the boltropes 27 and 28 are simultaneously shortened to the same degree, it is clear that the configuration of both panels of the flexible wing would be changed to the same degree. This would cause the wing to pitch downward. Conversely, simultaneously lengthening the boltrope would cause the wing to pitch upward from a trimmed condition. Inasmuch as the boltrope is in tension until the boltrope length exceeds the length of the fabric at the trailing edge, the boltrope has to be driven in only one direction, that is, to pull it in. The leading edge members 20 and 21 are angularly rigid with respect to the keel 19; thus, the flexible membrane is drawn in the nature of a draw string on a sack. By operating the control motors 32 and 36 asymmetrically the boltrope 27 is shortened and the boltrope 28 lengthened or vise versa and the wing is caused to roll.

Control is accomplished in much the same manner by the control mechanism 45 wherein a payload 56 is suspended from a flexible wing having a wing membrane 46. In this arrangement the actuator cables 52, in the vertical plane, are taken in and played out to move control arm 49 up and down. With this movement, the boltropes are simultaneously shortened, relative to the distance between the leading edge member and keel proper, thereby providing for pitch control. When the keel control arm 49 is displaced sideways by taking in and playing out, the actuator cables in the horizontal plane one of the boltropes is shortened and the other lengthened relatively providing for roll control. This is believed clearly illustrated in FIG. 5 wherein four possible positions of the keel control arm 49 are shown together with the corresponding position of the wing shown in dotted lines.

From the above description, it is believed clear that the invention herein disclosed provides an improvement in the control of flexible wing vehicles. The control is entirely independent of the position of the payload. Use of the boltrope to change the wing planform is an extremely simple device to provide control of the vehicle. Obviously, the forces necessary to shorten the boltrope are insignificant compared to the forces necessary to shift the payload with respect to the wing as is done in prior art arrangements. The control mechanism used for shortening the boltrope is also of simple design and a fraction of the weight of previously utilized equipment. Since the boltropes are directly connected to the control mechanisms, the control is rapid and response immediate. The boltrope control is adaptable to the flexible wing configuration regardless of the size or configuration of the wing.

While a preferred embodiment of this invention and a modification thereof has been described, it will be understood that other modifications and improvements may be made thereto. Such of these modifications and improvements as incorporate the principles of this invention are to be considered as included in the hereinafter appended claims unless these claims by their language expressly state otherwise.

What is claimed as new and desired to be secured by Letters Patent of the United States is:

We claim:

1. A control for an aerodynamic vehicle or the like comprising: a winged vehicle having structural members; flexible wing membrane being secured to said structural members; a tensionable member guided by and conforming substantially to the shape of said flexible membrane and being movable with respect thereto; and means for varying the tension on said tensionable member to alter the shape of said wing membrane and thereby provide a flight control for the vehicle.

2. A control for an aerodynamic vehicle or the like as in claim 1 wherein the tensionable member is a boltrope carried by said flexible membrane; and said means for varying the tension is means for changing the length of said boltrope.

3. A control for aerodynamic vehicle or the like as in claim 2 wherein said boltrope is carried by the trailing edge of said flexible membrane.

4. A control for an aerodynamic vehicle or the like as in claim 2 wherein the means for changing the length of the boltrope is a motorized drum.

5. A control for an aerodynamic vehicle or the like as in claim 2 wherein said means for changing the length of the boltrope is a movable portion of at least one of said winged vehicle structural members; and means for actuating the movable part of said winged vehicle structural member.

6. A control for a vehicle capable of flight comprising: a winged vehicle; said vehicle wing having a wing superstructure comprised of a keel and leading edge members; wing structure of said vehicle being a flexible membrane connected to said leading edge members and to said keel forming wing panels; a boltrope carried within each of said panels; and means for changing the length of said boltrope to alter the shape of said wing and thereby control the flight of said vehicle.

7. A control for a vehicle capable of flight as in claim 6 wherein said means for altering the length of said boltropes includes mechanism for symmertical and asymmetrical length variation of said boltropes.

8. A control for a vehicle capable of flight as in claim 6 wherein said means for changing the length of said boltropes includes winding drums, and power means connected to said drums for simultaneously shortening said boltropes or shortening one of said boltropes and lengthening the other boltrope.

9. A control for a vehicle capable of flight as in claim 6 wherein a portion of said keel is hinged; said boltropes being fixed to the hinged portion of said keel; and power means connected to the hinged portion of said keel to displace said hinged portion to shorten said boltropes or shorten one of said boltropes and lengthen the other.

10. A control for a vehicle capable of flight as in claim 6 wherein said boltropes are carried in enclosures formed in the trailing edge of said panels and being slidable therein.

References Cited by the Examiner
UNITED STATES PATENTS

| | | |
|---|---|---|
| 2,783,995 | 3/1957 | Fitzpatrick. |
| 3,135,483 | 6/1964 | Girard. |

MILTON BUCHLER, *Primary Examiner.*

FERGUS S. MIDDLETON, *Examiner.*

B. BELKIN, *Assistant Examiner.*